Patented May 18, 1943

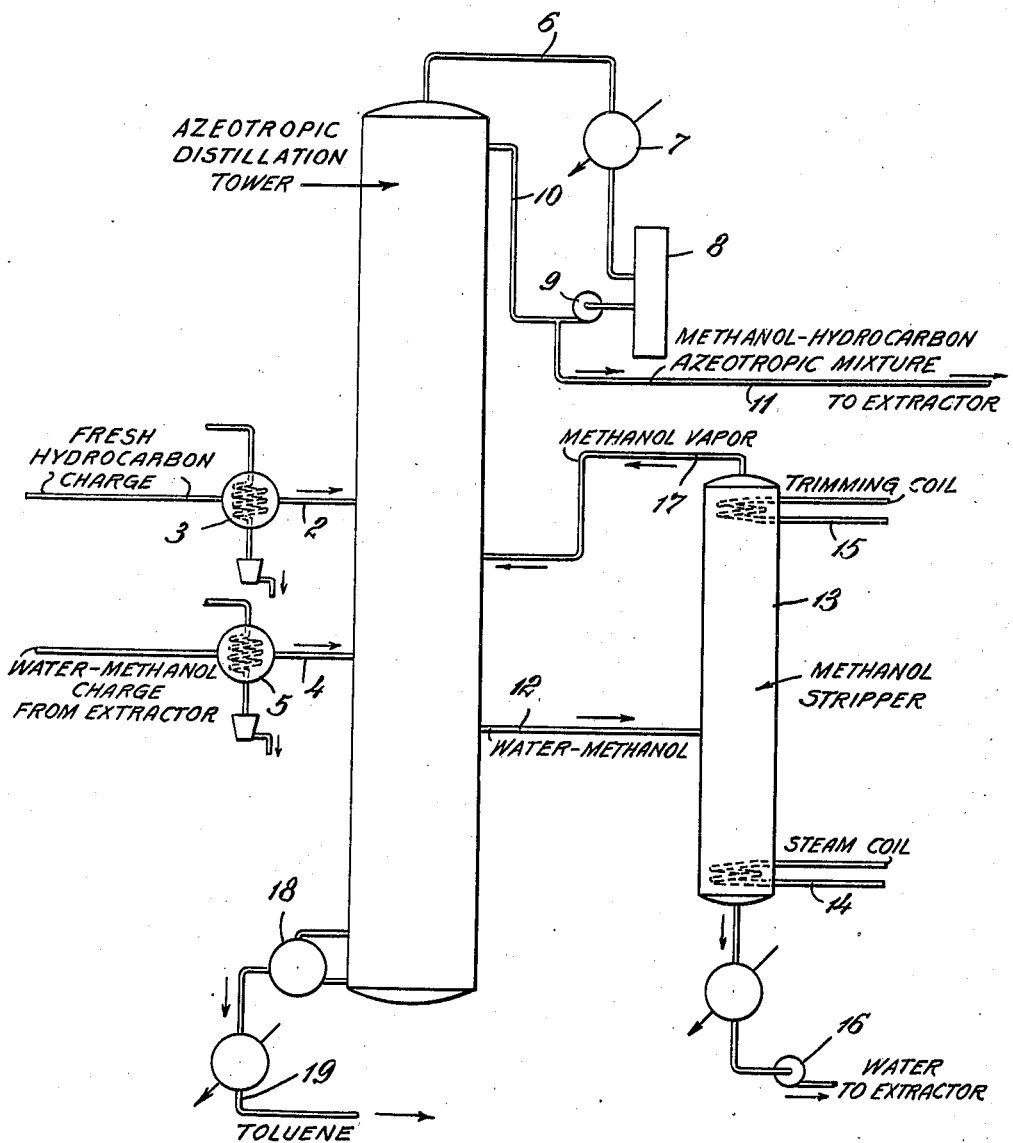

2,319,694

UNITED STATES PATENT OFFICE 2,319,694

SEPARATION OF HYDROCARBONS

Russell Lee, Wenonah, and Herbert K. Holm, Woodbury, N. J., assignors to Socony-Vacuum Oil Company, Incorporated, New York, N. Y., a corporation of New York Application February 6, 1941, Serial No. 377,620

2 Claims. (Cl. 202—42)

This invention has to do with the separation of aromatic and non-aromatic hydrocarbons of substantially similar boiling points by distillation in the presence of an added material, herein referred to as an azeotropic agent, which forms constant boiling mixtures with the non-aromatic hydrocarbons which constant boiling mixtures boil below the boiling point of the aromatic hydrocarbon or of any constant boiling mixture which may be formed therewith.

In such processes the desired aromatic material is recovered as a still-bottom product, the still overhead being a mixture of the non-aromatic hydrocarbons and the azeotropic agent. From this mixture, the azeotropic agent must be removed for return to the process and to permit conventional disposal of the non-aromatic hydrocarbons. Since the usually used azeotropic agents are also usually partly soluble or miscible with hydrocarbons but also capable of being precipitated or extracted therefrom by water, that method of separation is widely adopted, giving rise to an aqueous solution of the azeotropic agent, and requiring a further distillation for separation of this mixture before return of the azeotropic agent to the system.

This invention is specifically directed to operations for the separation of toluene from non-aromatic hydrocarbons of substantially similar boiling point in the presence of methanol as an azeotropic agent, and has for its object the provision of a process wherein there are provided proper distillation sequences to give in one continuous distillation step a toluene still bottom of high purity, a stream of water which is substantially methanol free and an overhead comprising the constant boiling mixture of methanol and non-aromatic hydrocarbons. As a further object, this invention provides for the distillation of the starting mixture of hydrocarbons in the presence of substantially nonaqueous methanol, the fractionation of the hydrocarbon vapors in the presence of substantially non-aqueous methanol, the stripping of the material not vaporized in the fractionator in the presence of water and methanol, the final "dry" stripping of the toluene residue, and simultaneous separation of water and methanol with return of said methanol to the column.

As disclosed in a copending application of the present inventors, in operations of the kind here discussed, separation of toluene from non-aromatic hydrocarbons by distillation in the presence of methanol is improved by the addition of water to the distillation system in amounts quite commensurate with those amounts useful in extracting methanol from the methanol-non-aromatic hydrocarbon condensate.

In order that this invention may be understood readily, reference is made to the drawing attached hereto, the single figure of which shows, in diagram, the operation involved.

In this drawing, 1 is a fractionating column, to which a mixture of hydrocarbons consisting of toluene and non-aromatic hydrocarbons of substantially similar boiling point is fed through pipe 2, having first passed through heater 3. At 4 a stream of aqueous methanol, later described is fed to the column, after heating in heater 5. At the top of the column, vapors removed through pipe 6, cooled in 7 and collected in 8 constitute a constant boiling mixture of methanol and the non-aromatic hydrocarbons of the feed stock. This mixture, physically homogeneous when condensed is taken from 8 by pump 9, a portion is returned by pipe 10 to the column as reflux, and the remainder passes through pipe 11 to an extractor, not shown, where a sufficient amount of water is added to effect separation of methanol and hydrocarbons, the aqueous methanol layer from such separation being returned to the column through pipe 4 as described. As noted, several plates of the column intervene between the entry point of pipes 2 and 4. A plate or so below the entry point of pipe 4, a side stream withdrawal pipe 12 serves to withdraw from column 1 as a side stream a mixture comprising substantially all of the water introduced through pipe 4 and a portion of the methanol so introduced. Suitable trap tray provisions are made in known manner within the column to provide for the collection and segregation of material for this stream. This material is led to side stream column 13 as feed thereof. 13 is equipped with reboiler heat coil 14 and trimming coil 15 and serves to separate its feed into a bottom stream of water withdrawn by pipe 16 to be returned to the methanol-hydrocarbon extraction step, and overhead vapor of dry methanol which is returned by pipe 17 to column 1 at a point below the entry of hydrocarbon feed, but above the entry of water-methanol feed. The liquid proceeding down the column 1 from the point where water-methanol sidestream is withdrawn, stripped in the exhausting section of the column under the influence of reboiler heater 18 comprises, when withdrawn, toluene of high purity.

In a single column, operating upon a hydrocarbon mixture containing around 40% or more of toluene, we are readily capable of recovering at this point a toluene of 90% or better purity, usually 98% purity, in yields of 80% or better based on toluene in feed. With original charge stocks more lean in toluene, it is economically better to operate a two column system, in the first of which the toluene separating operation is so conducted as to give a bottoms, which can readily be made to contain all the toluene in the original feed, and has a concentration of about 40% or more toluene, thus permitting final recovery of toluene of high purity in an operation as discussed above. In case of the double distillation operation, the set-up will be merely two main columns, each with its side column for recovery of methanol from water, and each main column will be operated as herein shown, either with separate extraction of methanol from the condensed overhead product from each main column, or more usually with extraction of methanol from the combined condensates and proportional return of the water-methanol mixture from the extractor to each column.

The process then is found to have the general characteristics of a closed process, wherein a charge consisting of hydrocarbons, water and azeotropic agent is fed to a continuous still, from which there are removed aromatic hydrocarbon, water, and a constant boiling mixture of azeotropic agent and non-aromatic hydrocarbons, to which mixture the water from the still is added to produce methanol-free non-aromatic hydrocarbons which are withdrawn from the process and a water-azeotropic agent mixture which is returned to the still. This process is further characterized by the fact that the separation within the still is improved by the presence of water therein in amounts which are greater than the amount needed to effect complete recovery of the azeotropic agent from the overhead condensate.

In this specification and in the claims, the term "constant boiling mixture" is made use of in full recognition of the fact that the non-aromatic hydrocarbons so removed are themselves a mixture and when considered from the standpoint of precision the term "constant boiling" is inexact. However, for any commercial distillation, and particularly for a continuously operating commercial distillation, the variations are sufficiently small that the material may be readily handled from the design and operating standpoint as a constant boiling mixture, and the term is used with that understanding.

We claim:

1. That method for the separation of toluene from a petroleum fraction containing toluene and non-aromatic hydrocarbons of boiling points substantially similar to toluene by distillation in the presence of methanol to produce toluene of high purity and a mixture of methanol and non-aromatic hydrocarbons, and separating the methanol and the non-aromatic hydrocarbons by extraction with water, in which the heated mixed hydrocarbon feed is introduced to a fractionating column at a point between the ends thereof, the water-methanol mixture from the extractor is heated and fed to the same column adjacent to but below the point of feed of hydrocarbons, withdrawing toluene from the bottom of the column, withdrawing a constant boiling mixture of methanol and non-aromatic hydrocarbons from the top of the column and passing it to the extractor, withdrawing a side stream of aqueous methanol from the column at a point below the introduction of water-methanol mixture, separating this stream by distillation into water and methanol vapor, and returning the methanol vapor to said column at a point below the hydrocarbon feed thereto and above the water-methanol mixture feed point.

2. That method for the separation of toluene from a mixture containing toluene and non-aromatic hydrocarbons of substantially similar boiling point comprising heating and feeding the hydrocarbon mixture to a fractionating column at a point between the ends thereof, feeding a heated water-methanol mixture to the column at a point adjacent to and below the hydrocarbon feed, withdrawing a second water-methanol mixture as a side stream from the column at a point below the water-methanol feed, distilling said side stream to separate methanol vapor from water, returning methanol vapor to the said column at a point below the mixed hydrocarbon feed, withdrawing toluene from the said column at the bottom of the exhausting section thereof, withdrawing a constant boiling mixture of methanol and non-aromatic hydrocarbons from the top of said column, condensing said mixture and adding water thereto to extract methanol therefrom and returning the aqueous methanol so formed to the said column as the total water-methanol feed thereof.

RUSSELL LEE.
HERBERT K. HOLM.